United States Patent
Zeh

(10) Patent No.: US 12,430,915 B2
(45) Date of Patent: Sep. 30, 2025

(54) METHOD FOR RECOGNIZING SURFACES

(71) Applicant: 4Art Holding AG, Steinhausen (CH)

(72) Inventor: Kai Zeh, Munich (DE)

(73) Assignee: 4Art Holding AG, Hünenberg (CH)

( * ) Notice: Subject to any disclaimer, the term of this patent is extended or adjusted under 35 U.S.C. 154(b) by 452 days.

(21) Appl. No.: 17/913,508

(22) PCT Filed: Mar. 3, 2021

(86) PCT No.: PCT/IB2021/051754
§ 371 (c)(1),
(2) Date: Sep. 22, 2022

(87) PCT Pub. No.: WO2021/191708
PCT Pub. Date: Sep. 30, 2021

(65) Prior Publication Data
US 2023/0206637 A1    Jun. 29, 2023

(30) Foreign Application Priority Data

Mar. 23, 2020   (CH) .................................. 00344/20

(51) Int. Cl.
*G06V 20/40*    (2022.01)
*G01B 11/25*    (2006.01)
(Continued)

(52) U.S. Cl.
CPC .............. *G06V 20/48* (2022.01); *G01B 11/25* (2013.01); *H04N 23/67* (2023.01); *H04N 23/80* (2023.01); *G06V 20/95* (2022.01)

(58) Field of Classification Search
CPC ........ G06V 20/48; G06V 20/95; G06V 10/10; G06V 20/80; G06V 10/74; H04N 23/67;
(Continued)

(56) References Cited

U.S. PATENT DOCUMENTS

| 4,924,086 A | 5/1990 | Weber |
| 5,673,338 A | 9/1997 | Denenberg |

(Continued)

FOREIGN PATENT DOCUMENTS

| CN | 104866837 B | 8/2015 |
| CN | 105740820 B | 7/2016 |

(Continued)

OTHER PUBLICATIONS

Response filed Aug. 26, 2024 for U.S. Appl. No. 17/913,497.
(Continued)

*Primary Examiner* — Phuoc Tran
(74) *Attorney, Agent, or Firm* — Fleit Intellectual Property Law; Paul D. Bianco; Stephen Bongini

(57) ABSTRACT

A method for recognizing surfaces, in particular for optically recognizing or identifying structured and/or pictorial surfaces involves the steps of: focusing a camera onto a prominent image dot on the surface; creating at least one live video stream of a recognizable, high-contrast area of the image dot; guiding the camera to the image frame of the video having the greatest depth of detail by focusing the camera onto a prominent image dot on the surface to be sensed; creating at least two images of a recognizable, high-contrast area of the image dot; storing the image having the greatest depth of detail as a reference image; analyzing each image frame of the live video stream; and comparing the image frame having the greatest depth of detail with a target image or reference image.

17 Claims, 2 Drawing Sheets

(51) Int. Cl.
*H04N 23/67* (2023.01)
*H04N 23/80* (2023.01)
*G06V 20/00* (2022.01)

(58) Field of Classification Search
CPC ......... G06T 2207/10016; G06T 7/0004; G06T 7/001; G06T 7/571; G06T 7/70; G06T 7/74

See application file for complete search history.

(56) References Cited

U.S. PATENT DOCUMENTS

| | | | |
|---|---|---|---|
| 7,531,349 | B1 | 5/2009 | Shepard et al. |
| 10,194,091 | B2 | 1/2019 | Nashizawa |
| 10,891,485 | B2 | 1/2021 | Anorga |
| 10,990,845 | B2 | 4/2021 | Boutant |
| 11,099,134 | B2 | 8/2021 | Prapenka |
| 11,448,598 | B1 | 9/2022 | Bhartia |
| 2003/0160182 | A1 | 8/2003 | Petrich et al. |
| 2004/0080661 | A1 | 4/2004 | Afsenius |
| 2004/0124359 | A1 | 7/2004 | Hamrelius et al. |
| 2005/0207943 | A1 | 9/2005 | Puzey |
| 2008/0266549 | A1 | 10/2008 | Schiedemeyer et al. |
| 2009/0101842 | A1 | 4/2009 | Shepard |
| 2010/0140476 | A1 | 6/2010 | Werner et al. |
| 2011/0044713 | A1 | 2/2011 | Masuda |
| 2011/0102577 | A1 | 5/2011 | Prakapenka |
| 2011/0240886 | A1 | 10/2011 | Tokhutuev |
| 2014/0140087 | A1 | 5/2014 | Scholtz |
| 2016/0178528 | A1 | 6/2016 | Weimer et al. |
| 2017/0038301 | A1 | 2/2017 | Flanagan |
| 2018/0059015 | A1 | 3/2018 | Li et al. |
| 2018/0106676 | A1* | 4/2018 | Jang .................. A61B 5/441 |
| 2018/0350052 | A1 | 12/2018 | Julkunen |
| 2019/0353590 | A1 | 11/2019 | Ribes Cortes et al. |
| 2020/0033579 | A1* | 1/2020 | Chou .................. A61B 5/00 |
| 2021/0109014 | A1 | 4/2021 | Heffels |
| 2021/0191457 | A1* | 6/2021 | Thorsten Heiko Schelske ............ G01J 3/524 |
| 2023/0105753 | A1 | 4/2023 | Zeh |
| 2023/0147881 | A1 | 5/2023 | Zeh |
| 2023/0243820 | A1 | 8/2023 | Karunen |

FOREIGN PATENT DOCUMENTS

| | | |
|---|---|---|
| CN | 108898597 A | 11/2018 |
| DE | 3737631 C1 | 3/1989 |
| DE | 10 2008 018586 A1 | 11/2009 |
| DE | 10 2014 018940 A1 | 6/2016 |
| DE | 10 2016 011497 B4 | 3/2018 |
| DE | 10 2017 000296 B4 | 7/2018 |
| EP | 1381035 A2 | 1/2004 |
| WO | 2012/087754 A1 | 6/2012 |
| WO | 2017/089736 A1 | 6/2017 |
| WO | 2017/198950 A1 | 11/2017 |
| WO | 2018/130693 A1 | 7/2018 |
| WO | 2018/212809 A1 | 11/2018 |
| WO | 2021/191707 A1 | 9/2021 |
| WO | 2021/191709 A1 | 9/2021 |

OTHER PUBLICATIONS

For U.S. Appl. No. 17/913,514; Final Office Action dated Oct. 4, 2024.
After Final Reply Pilot Request filed Dec. 2, 2024.
Office Action for EP 21 711 040.2—dated May 6, 2024.
Office Action for EP 21 710 597.2 dated May 8, 2024.
Office Action for EP 21 710 598.0 dated May 6, 2024.
International Search Report and Written Opinion issued for PCT/IB2021/051752, dated May 7, 2021.
International Search Report and Written Opinion issued for PCT/IB2021/051754, dated May 7, 2021.
International Search Report and Written Opinion issued for PCT/IB2021/051755, dated May 7, 2021.
Labati, Two-view contactless fingerprint acquisition system: A case study for clay artworks, Biometric measurements and systems for security and medical applications, Sep. 14, 2012, IEEE Workshop, pp. 1-8.
For U.S. Appl. No. 17/913,497: Office Action dated May 24, 2024.
For U.S. Appl. No. 17/913,514: Office Action dated May 20, 2024.

* cited by examiner

METHOD FOR RECOGNIZING SURFACES

FIELD OF THE INVENTION

The invention relates to a method for recognizing surfaces, in particular, for optically identifying structured and/or pictorial surfaces, for example, of paintings or sculptures.

Background

In DE 102014018940 A1, a method for assessing paint or varnish surfaces using a lamp is disclosed. The lamp, an LED or halogen lamp, should be able to produce a light spectrum that is similar to daylight and can be controlled or regulated. In particular, it should be possible to switch between daylight and the more suitable colour spectrum for assessing the surface.

A stationary optical scanning device for flat surfaces is disclosed in the DE 3737631 C1. It comprises a laser light source, a light deflection device impinged by the laser light beam, an imaging element, an imaging retroreflector and a light receiving device. It is used for detecting errors on reflective surfaces, wherein fluttering of the surface should not impair measurements.

A further stationary optical device for assessing the surfaces of a component is described in DE 102008018586 A1. Two light sources and a camera device are provided, wherein the camera receives the light beams of the light sources reflected on the surfaces of the component to generate an image of the surfaces.

A similar optical analysis device for detecting the characteristics of rectangular semiconductors is shown by DE 102016011497 B4.

An optical scanning device for recording and reproducing information using light beams with at least three wavelengths, an optical pickup device, is shown by EP 1381035 B1.

A stationary measuring system for surface assessment and hyperspectral imaging is described in DE 102017000296 A1. A illumination pattern of a first measuring light with a plurality of wavelengths is generated and the illumination pattern is imaged on the surface to be examined so that it can be sharply imaged by a chromatic lens at different distances. The intensity distribution of the split first measuring light is detected by means of a detector and topographical characteristics of the surface to be examined are determined from this. The surface is also homogeneously illuminated with a second measuring light. A multifocal chromatically encoded 3D measurement method is combined with a non-confocal second measuring light. The structure and composition of the surfaces should be quickly and accurately determinable.

In WO 2017089736 A1 and the WO 2017198950 A1 methods for authentication or extended authentication of objects are disclosed.

SUMMARY

An object of the invention is to develop a method for recognizing surfaces, assessing contrasts on surfaces that is simple to use independently of location and safe.

Accordingly, such a method is disclosed herein. The method according to the invention comprises the steps:
 Focusing a camera on a prominent image dot of the surface
 Creation of at least one live video stream images of a recognizable, high-contrast area of the image dot and
 Guiding the camera to the single frame of the video with the highest level of detail by focusing the camera on a prominent image dot of the surface to be assessed
 Creation of at least two images of a recognizable, high-contrast area of the image dot
 Storage of the image with the highest level of detail as a reference image.
 Analysis of each frame of the live video stream.
 Comparison of the single image with the highest level of detail with a target or reference image.

Preferred embodiments of the invention are disclosed in the dependent claims.

The method according to the invention enables an automatic creation of sharp and high-quality images of a surface from a predetermined distance by means of a terminal device, preferably a mobile device (mobile device), which is equipped with a camera.

BRIEF DESCRIPTION OF THE DRAWINGS

The invention is described in more detail below in an exemplary embodiment based on a drawing.

The figures show.

DETAILED DESCRIPTION

Figure 1:
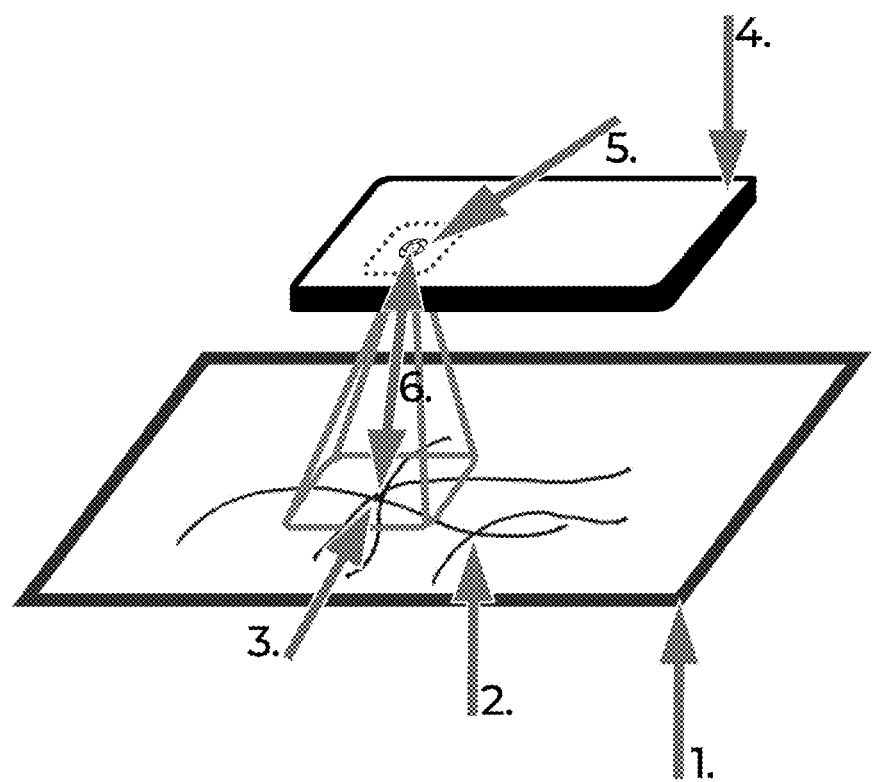
FIG. 1: an arrangement of a camera according to the invention over the surface to be detected.

A surface to be assessed 2, in the example of a painting 1, is first aligned horizontally or vertically (FIG. 1) and illuminated in an optimal and shadow-free manner by means of daylight and/or artificial light.

Subsequently, the auto-focusing of a camera 5 of a mobile device 4, for example, a tablet or a smartphone, is activated and the mobile device is aligned at a distance 6 of, for example, of 9-10 cm approximately parallel (horizontally or vertically) with relation to the surface 2 above a prominent image dot.

The camera 5 is focused if, for example, there is no re-focusing of the lens of the camera 5 within about 0.5 seconds. For this purpose, the physical position of the lens of the lens is continuously monitored. As far as the average of the obtained lens positions of the lens of the camera 5 from the last approx. 0.5 seconds corresponds to the next obtained lens position, the camera 5 is classified and triggered as focused by the software of the mobile device 4.

By means of the last determined physical lens position, the actual distance to the focused object (image dot 3 of the surface 2) can be calculated by the aforementioned software, provided that the camera 5 is already measured.

Based on the measured reference distances and the corresponding lens positions, the control electronics of the mobile device 4 calculate the current distance to the focused object. If the distance corresponds to a defined specification, a video recording is automatically created from an area that can be recognized.

Each individual image of the live video stream is sent to a subroutine of the control electronics for processing (if necessary, individual frames can remain unprocessed at the expense of accuracy). In each image to be processed, high-contrast image dots 3 are identified. Colours, contrasts, distances and/or depths of structures are automatically determined. These image dots 3 are surrounded by significantly stronger or weaker intense image dots.

Geometric shapes are then projected on the basis of the identified high-contrast image dots 3. These image dots 3 form the corners of the projected geometric figures. The number, positions, and sizes of the geometric figures are stored in a data set for each image.

The target image or target image, which is to be found in the video stream, is prepared. The data records of the target image and the single image with the highest level of detail are compared with each other. If the target image is found in the single frame of the video, this can be determined by comparing the data sets. The number of projected geometric figures indicates the level of detail of an image.

The image with the highest level of detail, i.e., the largest number of details, is selected for further processing and stored as a reference (target image) and/or has already been created or stored at an earlier point in time.

Due to the coordinates of image dot 3 determined in this way, a marking for the target image can be drawn in the single frame with the highest level of detail, the position of the target image can be determined in the single frame of the video.

By subsequently importing the modified individual image into the video stream, the user can be guided to the desired position (target image), or the position of the target image is displayed.

Figure 2:
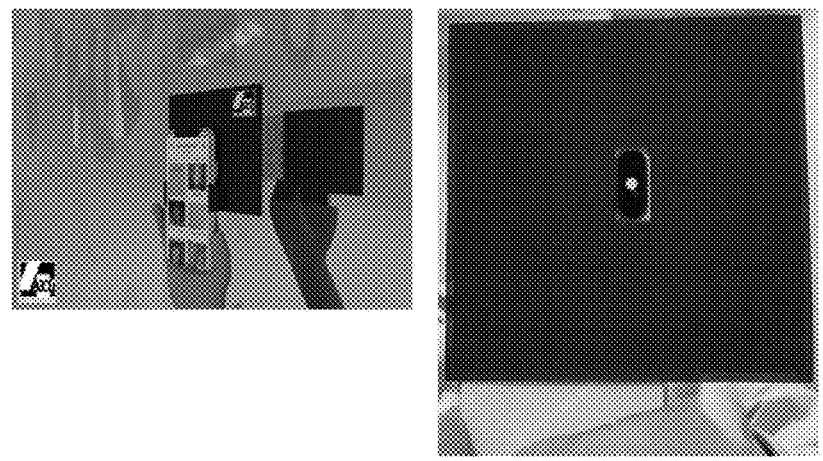
FIG. 2: the camera according to FIG. 1 with glare protection.
Figure 2:
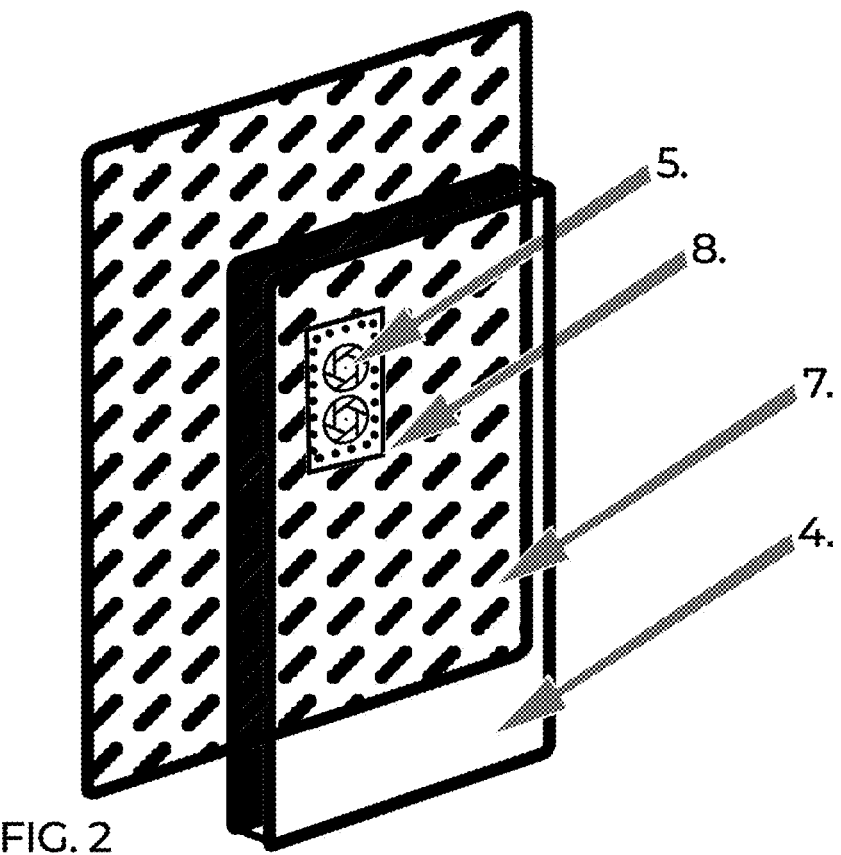

If the surface to be assessed mirrors 2 and/or is located behind a reflective, transparent cover, the mobile device 4 can be provided with a reversible glare protection 7. This glare protection 7 is, in the example, a flat square frame with a cut-out 8 for the camera 5. The glare protection 7 can, for example, be magnetically mounted and positioned on the mobile device 4 by means of a guide rail or click connection (FIG. 2).

In order to assess a surface for the first time, the aforementioned software/app must be installed on the mobile device 4 and this must be registered and authenticated.

Registration Procedure:
1. Collection of the personal data of the owner of the object to be recorded (artwork)
2. Acquisition of the key data of the object, such as name, creator, year of creation, dimensions in centimetres
3. Photography of the front side of the entire object
4. Optional photography of the back side/remaining sides of the object
5. Selection of an area on the object that is to be used as a recognizable area (and/or fingerprint)
6. Capture of the surface of the object using mobile device 4 according to the aforementioned description (creation of an image with the highest level of detail of the selected area).
7. In order to further increase the quality of the selected reference image (target image), the aforementioned live video stream is created with the same camera 5 and, if necessary, further individual images of the selected area are created
8. The ultimately best image from steps 5-7 is saved
9. To ensure that the stored image is suitable as a reference for a fingerprint, another image of the selected area is created according to the above description and stored as a secondary reference image.
10. The reference image from step 8, as well as the secondary reference image from step 9, will be used for future comparisons of the selected area.

Authentication Process:

The user wants to determine whether a work of art/object in his possession corresponds to the object originally recorded during the registration process or is identical to it.

A1. The user selects the artwork/object to be authenticated from his collection
A2. The reference image from step 8 of the registration process is now used to create the best possible image of the same area (image dot 3) from a distance 6 of, for example, 9-10 cm according to steps 6 and/or 7 of the registration
A3. The best image from step A2 is saved as an authentication image for further processing
A4. The stored authentication image is now compared with the reference image from the registration process by the control electronics/app of the mobile device 4
A5. On the basis of matches between the authentication image and the reference image, the user receives a statement as to whether the artwork/object is the same or whether it is not the artwork/object originally recorded during the registration process.

LIST OF REFERENCE NUMBERS 1 painting
2 surface
3 image dot
4 mobile device
5 camera
6 distance
7 glare protection
8 cut-out

The invention claimed is:

1. A method for recognizing and/or for capturing structured and/or pictorial surfaces using a mobile device, the method comprising:
   focusing a camera of the mobile device on a prominent image dot of a surface to be recognized and/or captured;
   creating at least one live video stream of a recognizable and/or capturable, high-contrast area of the prominent image dot;
   guiding the camera to an image of the live video stream with the largest number of details by focusing the camera on the prominent image dot of the surface;
   creating at least two images of the live video stream of the recognizable and/or capturable, high-contrast area of the prominent image dot using the camera;
   analyzing each image of the live video stream to determine a number of details in each image;
   storing the image with the largest number of details as a reference image; and
   comparing the image with the largest number of details with a target image.

2. The method according to claim 1, wherein the method further comprises determining a position of the target image in the image of the live video stream.

3. The method according to claim 1, wherein when focusing the camera on the prominent image dot, a distance of the camera from the surface is 9-10 cm.

4. The method according to claim 2, wherein when focusing the camera on the prominent image dot, a distance of the camera from the surface is 9-10 cm.

5. The method according to claim 1, wherein the method further comprises comparing the reference image with an image of the prominent image dot of the surface created at a later time.

6. The method according to claim 2, wherein the method further comprises comparing the reference image with an image of the prominent image dot of the surface created at a later time.

7. The method according to claim 3, wherein the method further comprises comparing the reference image with an image of the prominent image dot of the surface created at a later time.

8. The method according to claim 4, wherein the method further comprises comparing the reference image with an image of the prominent image dot of the surface created at a later time.

9. The method according to claim 1, wherein analyzing each image of the live video stream comprises identifying high-contrast image dots in each image and projecting geometric shapes based on the high-contrast image dots that are identified.

10. The method according to claim 9, wherein the number of details in each image is based on the number of geometric shapes that are projected for the image.

11. A method for recognizing and/or for capturing structured and/or pictorial surfaces using a mobile device, the method comprising:
focusing a camera of the mobile device on a prominent image dot of a surface;
creating at least one live video stream of a recognizable, high-contrast area of the prominent image dot;
analyzing images of the live video stream to determine a number of details in each of the images; and
storing the image with the largest number of details as a reference image.

12. The method according to claim 11, wherein analyzing images of the live video stream comprises identifying high-contrast image dots in each of the images.

13. The method according to claim 12, wherein analyzing images of the live video stream further comprises projecting geometric shapes based on the high-contrast image dots that are identified.

14. The method according to claim 12, wherein analyzing images of the live video stream further comprises projecting geometric shapes based on the high-contrast image dots that are identified, the high-contrast image dots forming corners of the geometric shapes.

15. The method according to claim 14, wherein the number of details in each of the images is based on the number of geometric shapes that are projected for the image.

16. The method according to claim 11, wherein the method further comprises comparing the reference image with an image of the prominent image dot of the surface created at a later time.

17. A method for recognizing and/or for capturing structured and/or pictorial surfaces using a mobile device, the method comprising:
focusing a camera of the mobile device on an image dot of a surface;
storing a single image of a recognizable, high-contrast area of the image dot as a reference image;
creating at least one live video stream of the recognizable, high-contrast area of the image dot;
analyzing a plurality of images from the live video stream to determine a number of details in each of the images; and
storing the image from the live video stream with the largest number of details as the reference image if it has more details than the single image.

* * * * *